D. M. Reynolds,
Horse Power.

Nº 41,020.        Patented Dec 22, 1863.

Witnesses.

Inventor.

UNITED STATES PATENT OFFICE.

DAVID M. REYNOLDS, OF RISING SUN, MARYLAND.

IMPROVEMENT IN SAFETY-BRAKES FOR HORSE-POWERS.

Specification forming part of Letters Patent No. 41,020, dated December 22, 1863.

*To all whom it may concern:*

Be it known that I, DAVID M. REYNOLDS, of Rising Sun, Cecil county, Maryland, have invented a Safety-Brake for Horse-Powers; and I do hereby declare the following to be a full, clear, and exact description of the same, reference being had to the accompanying drawings, and to the letters of reference marked thereon.

My invention consists of mechanism, fully described hereinafter, for stopping the movement of the main shaft of a horse power when the driving-belt slips from the pulleys or breaks, thereby preventing the accidents to which the horses are liable when such occurrences take place.

In order to enable others familiar with the construction and operation of horse powers to make and apply my invention, I will now proceed to describe its construction and operation.

Figure 1:
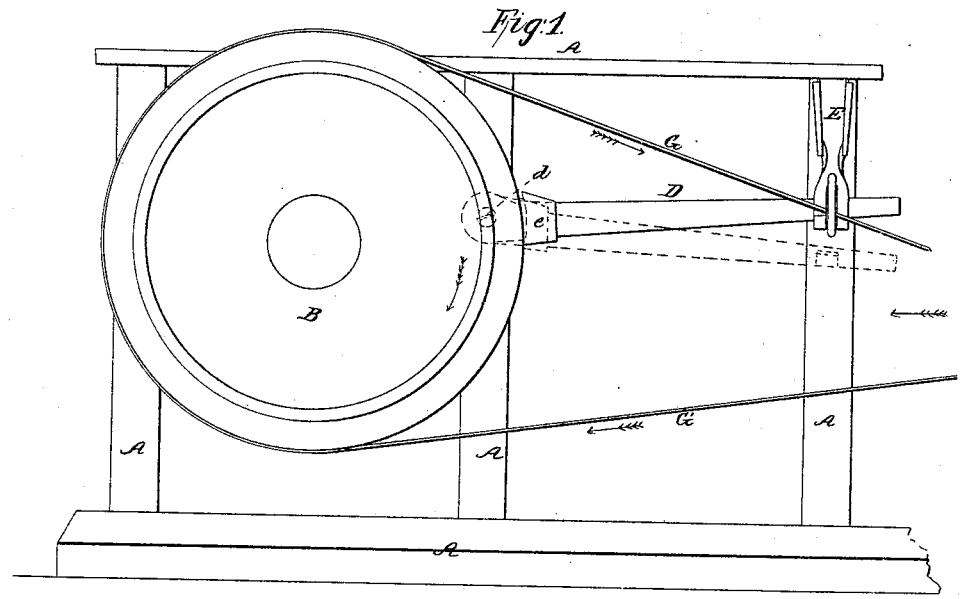
Figure 2:
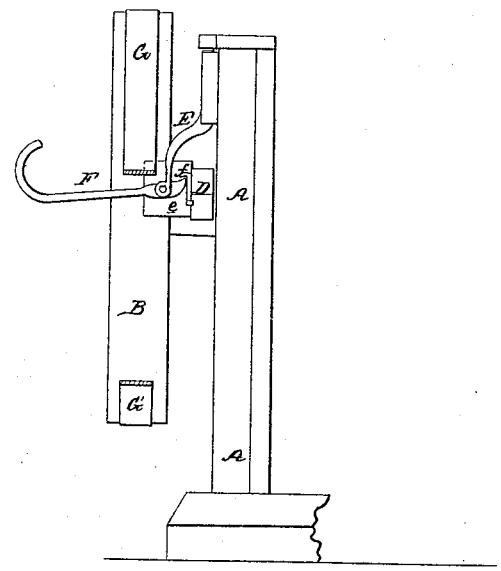

On reference to the accompanying drawings, which form a part of this specification, Figure 1 is a side view of my improved safety-brake for horse-powers; and Fig. 2 is an end view, looking in the direction of the arrow, Fig. 1.

A represents a portion of the frame-work on one side of a horse-power machine, such as are generally used in the agricultural districts, B representing the driving-pulley, secured to the shaft, round which passes the usual endless band of slats, to be operated by a horse or horses in the manner too well known to those familiar with these implements to need description.

D is a lever, having its fulcrum on a pin, $d$, (shown by dotted lines, Fig. 1,) secured to the frame A, this lever being furnished with a shoe or rubber, $e$, adapted to the periphery of the driving-pulley B.

To the frame of the machine is secured a bracket, E, to the lower end of which is hung loosely a lever, F, having a long bent arm and a short curved arm with a pointed end, on which a projection, $f$, on a plate attached to the lever D, near the outer end of the same is arranged to rest. Round the pulley B passes the belt G G' to the pulley of any machine which the horse-power may be required to drive, the upper portion, G, of the belt passing above the long arm of the lever F, and as close as possible to the same without being in actual contact therewith.

In using horse-powers of this class the horses are liable to severe if not fatal accidents when the driving-belt slips from the pulleys or breaks, owing to the fact that the horses, being suddenly relieved from the uniform exertion which they had been making prior to the slipping of the belt, must certainly fall and receive injuries—an evil which my invention has been designed to obviate. It should be here understood that the driving-pulley revolves and the belt traverses in the direction pointed out by their arrows. As long as the belt remains whole, the lever D is retained by the lever F, or, as it may be termed, the "trigger," in the position shown by black lines, Fig. 1, the shoe or rubber $e$ being free from contact with the periphery of the driving-pulley B. The moment the belt G G' slips from the pulleys round which it passes, or the moment the belt breaks, the upper portion of the belt must come in contact with the long arm of the lever or trigger F, depressing that arm and instantly relieving the lever D from its support on the short arm of the lever F. The lever D consequently falls to the inclined position shown by red lines, Fig. 1, and the shoe or rubber $e$ is brought into instant contact with the periphery of the wheel B, which, revolving in the direction of the arrow, has a tendency to drag the shoe or rubber downward, and to cause it to bear with such force upon the wheel that the further movement of the latter, as well as that of the endless chain of slats on which the horses tread, must be at once checked, the horses being thereby freed from any liability to accidents.

Without confining myself to the precise construction and arrangement of the above-described parts, which may be considerably modified without departing from the main features of my invention, I claim and desire to secure by Letters Patent—

The lever D, with its rubber $e$, constructed and arranged in respect to the driving or other pulley of a horse power, substantially as described, in combination with the trigger or lever F, or other equivalent device, by which the lever D will be released and its rubber *e* brought in contact with the driving-wheel when the belt slips from the pulleys or when the belt is broken.

In testimony whereof I have signed my name to this specification in the presence of two subscribing witnesses.

DAVID M. REYNOLDS.

Witnesses:
E. H. WILLIAMS,
JAMES V. JOHNSON.